(12) United States Patent
Sekita (10) Patent No.: US 9,831,714 B2
(45) Date of Patent: Nov. 28, 2017

(54) BATTERY STORAGE SYSTEM AND CONTROLLING METHOD OF THE SAME

(71) Applicant: Sony Corporation, Tokyo (JP)

(72) Inventor: Suguru Sekita, Tokyo (JP)

(73) Assignee: Sony Corporation, Tokyo (JP)

( * ) Notice: Subject to any disclaimer, the term of this patent is extended or adjusted under 35 U.S.C. 154(b) by 490 days.

(21) Appl. No.: 14/522,972

(22) Filed: Oct. 24, 2014

(65) Prior Publication Data

US 2015/0123474 A1 May 7, 2015

(30) Foreign Application Priority Data

Nov. 1, 2013 (JP) ................................. 2013-228716

(51) Int. Cl.
*H02J 4/00* (2006.01)
*H02J 7/35* (2006.01)
*H02J 3/38* (2006.01)

(52) U.S. Cl.
CPC ................. *H02J 7/35* (2013.01); *H02J 3/383* (2013.01); *Y02E 10/563* (2013.01); *Y02E 10/566* (2013.01); *Y10T 307/344* (2015.04)

(58) Field of Classification Search
CPC ...................................... H02J 4/00; H02J 7/35
USPC ................. 307/23, 43, 52, 66, 101; 320/101
See application file for complete search history.

(56) References Cited

U.S. PATENT DOCUMENTS

| 8,373,303 | B1* | 2/2013 | Daniels | H02J 7/35 307/23 |
| 2010/0244573 | A1* | 9/2010 | Karnick | H02J 7/34 307/80 |
| 2011/0140667 | A1* | 6/2011 | Moon | H02J 3/32 320/134 |
| 2011/0144822 | A1* | 6/2011 | Choi | H02J 3/32 700/297 |
| 2011/0148195 | A1* | 6/2011 | Lee | H02J 7/35 307/25 |
| 2011/0221383 | A1* | 9/2011 | Uehashi | H02J 7/35 320/101 |
| 2012/0032507 | A1* | 2/2012 | Yamane | H02J 9/062 307/23 |
| 2012/0181864 | A1* | 7/2012 | Honma | H01M 10/44 307/23 |
| 2012/0212050 | A1* | 8/2012 | Takehara | H02J 7/35 307/22 |

(Continued)

FOREIGN PATENT DOCUMENTS

JP 2008-054473 3/2008

*Primary Examiner* — Jared Fureman
*Assistant Examiner* — Win Htun
(74) *Attorney, Agent, or Firm* — K&L Gates LLP (57) ABSTRACT

A battery storage system includes: an energy converting unit configured to generate electrical power; a power converter including a control circuit, and a circuit that is controlled by the control circuit to generate electrical power to be supplied from an output of the energy converting unit to a load and electrical power to be supplied to the control circuit; a power supply source including a battery storage cell and a commercial power system; and a host control circuit configured to perform control such that electrical power is supplied from the power supply source to the control circuit when an output of the energy converting unit is between a first value and a second value larger than the first value.

7 Claims, 5 Drawing Sheets

(56) References Cited

U.S. PATENT DOCUMENTS

| | | | | |
|---|---|---|---|---|
| 2012/0228944 A1* | 9/2012 | Koshin | ............... | H01M 10/44 307/66 |
| 2013/0036320 A1* | 2/2013 | Yoshimura | ............ | G06F 1/3203 713/323 |
| 2013/0113281 A1* | 5/2013 | Togashi | ................. | H02J 3/383 307/23 |
| 2013/0241495 A1* | 9/2013 | Min | ......................... | H02J 3/32 320/134 |
| 2014/0111137 A1* | 4/2014 | Tanikawa | ............. | H01M 10/44 320/101 |
| 2014/0361725 A1* | 12/2014 | Nishikawa | ............... | H02J 9/06 320/101 |
| 2015/0022004 A1* | 1/2015 | Okuda | .................... | H02J 3/32 307/66 |
| 2015/0028677 A1* | 1/2015 | Iwasaki | ................... | H02J 9/06 307/52 |
| 2015/0303731 A1* | 10/2015 | Takahashi | ............... | H02J 3/32 320/127 |

* cited by examiner

BATTERY STORAGE SYSTEM AND CONTROLLING METHOD OF THE SAME

CROSS REFERENCES TO RELATED APPLICATIONS

The present application claims priority to Japanese Priority Patent Application JP 2013-228716 filed in the Japan Patent Office on Nov. 1, 2013, the entire content of which is hereby incorporated by reference.

BACKGROUND

The present application relates to a battery storage system that stores electrical power, which is obtained by a natural energy converting apparatus, for example, a photovoltaic power generation module, in a battery storage cell and converts electrical power to be supplied to a load, and to a controlling method of the same.

In recent years, battery storage systems each combining a plurality of power supplies such as a photovoltaic cell, a battery storage cell, and a commercial power system have prevailed more and more. This battery storage system includes a power converter that generates, from an output voltage of the photovoltaic cell, electrical power to be supplied to a load and further electrical power for charging the battery storage cell, a control circuit that controls this power converter, and the like.

In such a battery storage system, for constantly stably operating the control circuit, it is important how to ensure an operating power supply of the control circuit in the case of power failure of the commercial power system, for example.

For example, Japanese Patent Application Laid-open No. 2008-054473 (paragraphs 0023-0031) discloses one that enables necessary electrical power to be supplied from any of a photovoltaic cell, a battery storage cell, and a commercial power system to a control unit. Specifically, in the case of power failure of the commercial power system, the electrical power is supplied from the photovoltaic cell or the battery storage cell and, when the battery storage cell reaches a discharge lower limit, the electrical power is supplied from the photovoltaic cell or the commercial power system. With this, it is possible to keep the stable operation of the control unit.

Note that, regarding selection from among the outputs of the photovoltaic cell, the battery storage cell, and the commercial power system, the following methods are disclosed, for example. As one of the methods, output voltages are compared with one another and the output of the power supply that can provide a highest output voltage is selected. As another method, the output of the power supply that can provide an output voltage larger than a predetermined set value is selected.

SUMMARY

In a system that generates electrical power from natural energy such as sunlight, the output voltage exhibits fluctuations depending on the state of the nature. Such output fluctuations are not problematic while the output voltage sufficient to stably operate the control circuit is being obtained.

However, fluctuations when the output voltage is below a sufficient level can lead to an unstable operation of the control circuit and cause trouble. The output voltage is low for a long time upon sunrise, immediately after sunset, or in cloudy or rainy weather, for example. In these cases, the operation of the control circuit is likely to be unstable.

Therefore, it is desirable to further enhance various performances including stability in the battery storage system using the natural energy converting unit.

In addition, the same problem occurs not only in the battery storage system using the natural energy converting unit but also in the battery storage system using the energy converting unit whose output suddenly fluctuates.

In view of the above-mentioned circumferences, it is desirable to provide a battery storage system excellent in performance such as stability and a controlling method of the same.

According to an embodiment of the present application, there is provided a battery storage system including: an energy converting unit configured to generate electrical power; a power converter including a control circuit, and a circuit that is controlled by the control circuit to generate electrical power to be supplied from an output of the energy converting unit to a load and electrical power to be supplied to the control circuit; a power supply source including a battery storage cell and a commercial power system; and a host control circuit configured to perform control such that electrical power is supplied from the power supply source to the control circuit when an output of the energy converting unit is between a first value and a second value larger than the first value.

In the battery storage system according to the embodiment, the first value may be a value at which an operation of the control circuit is started, and the second value may be a value for ensuring the operation of the control circuit.

The energy converting unit may be configured to generate electrical power from natural energy.

The host control circuit may be configured to perform control such that, when the output of the energy converting unit is lower than a third value set in advance as a value lower than the first value during supply of electrical power from the power supply source to the control circuit, the supply of electrical power from the power supply source to the control circuit is stopped.

The host control circuit may be configured to perform control such that, when the output of the energy converting unit is higher than a fourth value set in advance as a value higher than the second value during supply of electrical power from the power supply source to the control circuit, the supply of electrical power from the power supply source to the control circuit is stopped.

The host control circuit may be configured to accumulate data of the output of the energy converting unit and update, based on the data, the third value and the fourth value.

The host control circuit may be configured to acquire, when controlling such that electrical power is supplied from the power supply source to the control circuit, information of a state of charge (SOC) of the battery storage cell, and control such that electrical power is supplied from the battery storage cell to the control circuit when the SOC is larger than a predetermined value and that electrical power is supplied from the commercial power system to the control circuit when the SOC is equal to or smaller than the predetermined value.

According to another embodiment of the prevent technology, there is provided a controlling method of a battery storage system characterized by including performing control such that electrical power is supplied from a power supply source including a battery storage cell and a commercial power system to a control circuit of a power converter when an output of an energy converting unit configured to generate electrical power is between a first value and a second value larger than the first value, the power converter including the control circuit and a circuit that is controlled by the control circuit to generate electrical power to be supplied from the output of the energy converting unit to a load and electrical power to be supplied to the control circuit.

As described above, according to embodiments of the present application, it is possible to enhance the performance such as stability of a battery storage system.

These and other objects, features and advantages of the present disclosure will become more apparent in light of the following detailed description of best mode embodiments thereof, as illustrated in the accompanying drawings.

Additional features and advantages are described herein, and will be apparent from the following Detailed Description and the figures.

BRIEF DESCRIPTION OF THE FIGURES

FIG. 4 is a view for describing a third value and a fourth value for evaluating the output voltage Vo after a switch is turned on.

DETAILED DESCRIPTION

Hereinafter, an embodiment of the present application will be described with reference to the drawings.

First Embodiment

Figure 1:
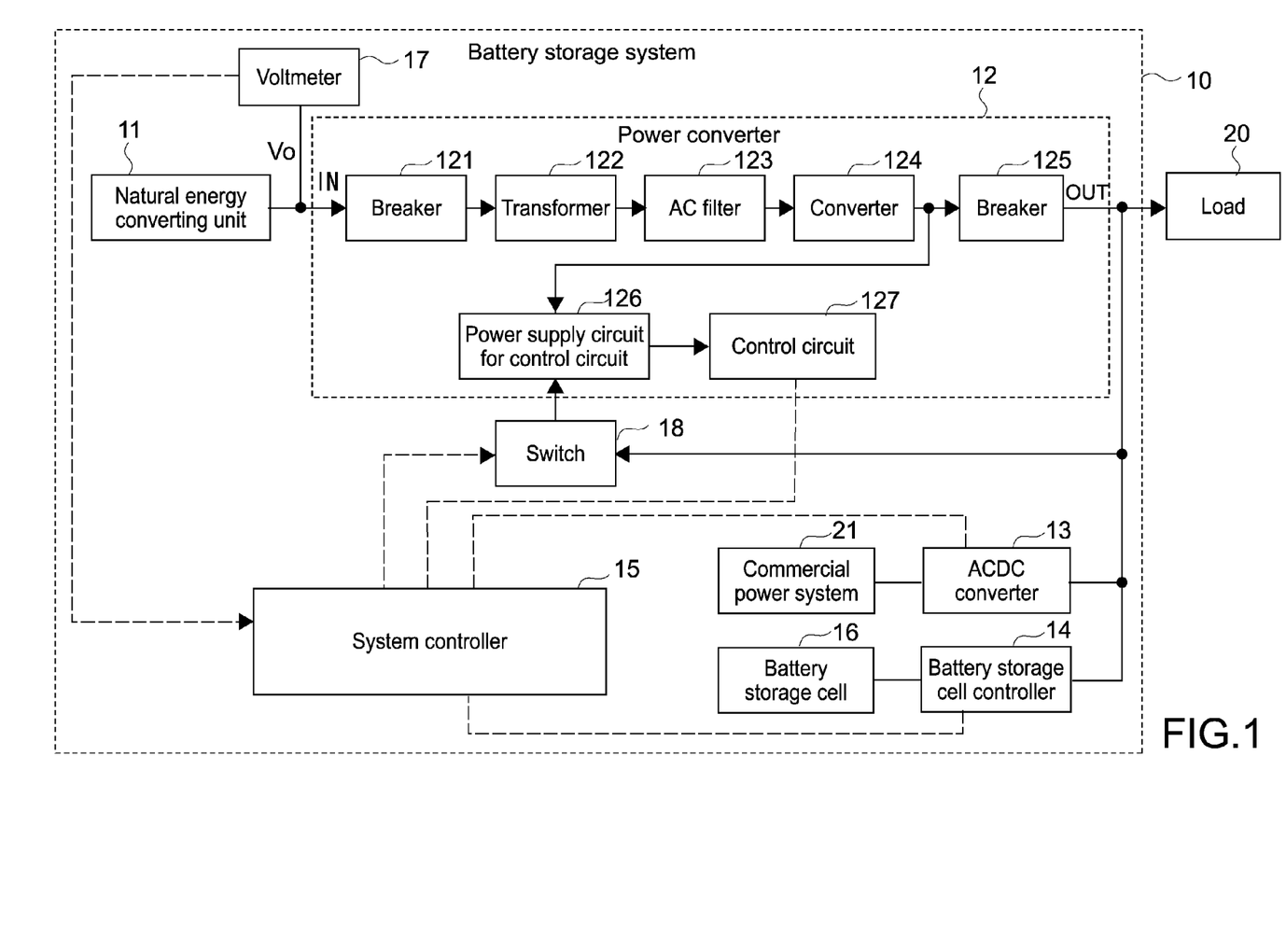
FIG. 1 is a block diagram showing a configuration of a battery storage system according to a first embodiment of the present application.

FIG. 1 is a block diagram showing a configuration of a battery storage system according to a first embodiment of the present application.

As shown in the figure, a battery storage system 10 according to this embodiment includes a natural energy converting unit 11, a power converter 12, an ACDC converter 13, a battery storage cell controller 14, a system controller 15, a battery storage cell 16, a voltmeter 17, and a switch 18.

The natural energy converting unit 11 is a module for converting energy of nature (natural energy) such as sunlight, wave power, wind power, and terrestrial heat into electrical power. For example, a photovoltaic power generation module is used. Note that the present application is not limited to one using the module for converting the energy of nature into the electrical power. It only needs to be an energy converting unit whose output can suddenly fluctuate.

The power converter 12 is an apparatus that generates, from the electrical power obtained by the natural energy converting unit 11, electrical power to be supplied to a load 20 and electrical power for charging to be supplied to the battery storage cell 16. A detailed configuration of the power converter 12 will be described later.

The ACDC converter 13 is an apparatus that converts an alternating-current (AC) power taken in from a commercial power system 21 into a direct-current (DC) power (constant voltage).

The battery storage cell controller 14 is a controller that performs control to charge the battery storage cell 16 with direct-current power from the power converter 12 or the ACDC converter 13 under control of the system controller 15 and to cause the battery storage cell 16 to discharge to supply the load 20 with the electrical power. Further, the battery storage cell controller 14 is configured to estimate a state of charge (SOC) of the battery storage cell 16 and notify the system controller 15 of the SOC.

The voltmeter 17 measures the output voltage Vo of the natural energy converting unit 11 and notifies the system controller 15 of a measurement result. It is not limited to the voltmeter and only needs to measure the output of the natural energy converting unit 11.

The switch 18 is a switch that turns on/off the supply of electrical power from the commercial power system 21 and the battery storage cell 16 to (a power supply circuit 126 for a control circuit in) the power converter 12 under control of the system controller 15.

The system controller 15 (host control circuit) performs various controls of the entire battery storage system 10. As one of the controls, the system controller 15 is configured to, according to a program stored in an internal memory, perform control to change the source supplying electrical power to the power supply circuit 126 for the control circuit in the power converter 12 when the output voltage Vo of the natural energy converting unit 11 is in an unstable region to be described later.

[Configuration of Power Converter 12]

As shown in FIG. 1, the power converter 12 includes an input breaker 121, a transformer 122, an AC filter 123, a voltage converter 124, an output breaker 125, the power supply circuit 126 for the control circuit, and a control circuit 127.

The input breaker 121 is a breaker for turning on/off the input of electrical power from the natural energy converting unit 11. The input breaker 121 is configured to be turned off for preventing the power converter 12 from being destroyed, for example, when excessive electrical power is output from the natural energy converting unit 11, for example.

In the case where the output of the natural energy converting unit 11 is an alternating current, the transformer 122 transforms an AD voltage thereof into an AC voltage having a magnitude suitable for the subsequent process. In the case where the output of the natural energy converting unit 11 is a direct current, the transformer 122 causes the output to pass therethrough as it is, for example. Thus, if the output of the natural energy converting unit 11 is a DC, the transformer 122 is not necessarily necessary.

The AC filter 123 is a circuit that removes AC components from the output of the transformer 122 and generates a DC. Thus, if the output of the natural energy converting unit 11 is a DC and stable, the AC filter 123 is not necessarily necessary.

The voltage converter 124 is a converter that converts the DC voltage obtained by the AC filter 123 into a voltage suitable for the load 20 or a voltage suitable for charging the battery storage cell 16.

The output breaker 125 is a breaker for preventing the power converter 12 from outputting excessive electrical power to the load 20 or the battery storage cell 16.

The power supply circuit 126 for the control circuit is a power supply apparatus that generates a stable DC voltage necessary for operating the control circuit 127.

The control circuit 127 is a controller that controls the above-mentioned blocks of the power converter 12 and communicates with the system controller 15 being the host control circuit.

[Output Fluctuations of Natural Energy Converting Unit 11]

Figure 3:
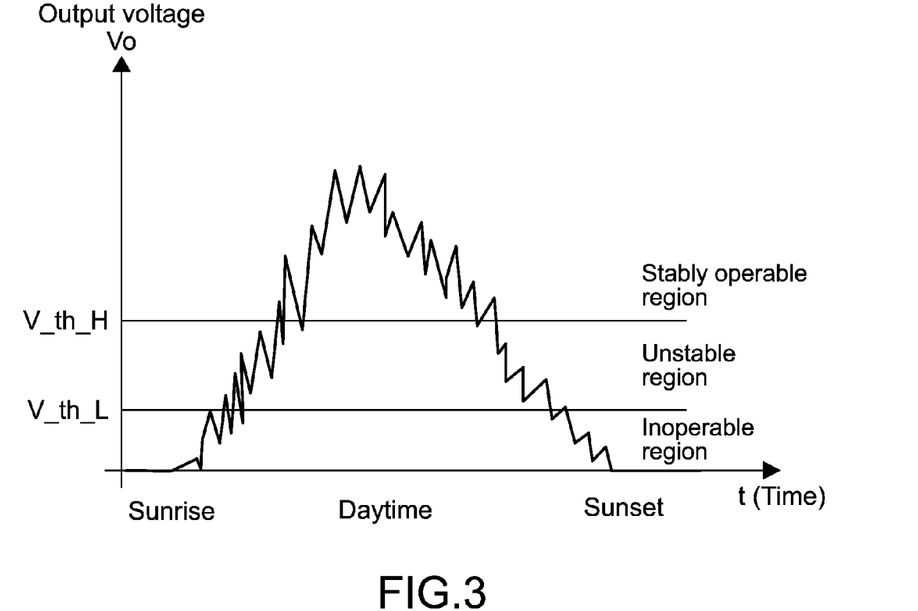
FIG. 3 is a view showing fluctuations of an output voltage Vo of a natural energy converting unit from sunrise to sunset in the case where a photovoltaic power generation module is assumed as the natural energy converting unit.

FIG. 3 is a view showing fluctuations of the output voltage Vo of the natural energy converting unit 11 from the sunrise to the sunset, assuming that the natural energy converting unit 11 is a photovoltaic power generation module.

As shown in the figure, the output voltage Vo of the natural energy converting unit 11 gradually increases while repeating small up and down fluctuations from the sunrise to a certain point of time of the daytime. After that, the output voltage Vo of the natural energy converting unit 11 gradually decreases while repeating the small up and down fluctuations until the sun sets. Here, V_th_L indicates an output voltage at which an operation of the control circuit 127 is started and V_th_H indicates an output voltage for ensuring the operation of the control circuit 127. The output voltage for ensuring the operation of the control circuit 127 means, for example, a voltage set to have a value larger than V_th_L for preventing the output voltage Vo of the natural energy converting unit 11 from being lower than V_th_L due to the small up and down fluctuations.

The specific value and range of V_th_L is, for example, 100 V to 150 V. The specific value and range of V_th_H is, for example, 180 V to 220 V. As the maximum fluctuation amount of the output voltage Vo, for example, 50 V to 100 V is assumed.

When the output voltage Vo of the natural energy converting unit 11 is below V_th_L, the control circuit 127 is not operated. Thus, the range in which the output voltage Vo is below V_th_L will be referred to as an "inoperable region." Further, when the output voltage Vo of the natural energy converting unit 11 is above V_th_H, the control circuit 127 is stably operated. Thus, the range in which the output voltage Vo is above than V_th_H will be referred to as an "stably operable region." Further, in a region in which the output voltage Vo of the natural energy converting unit 11 takes a value of from V_th_L to V_th_H, the output voltage Vo can fall below V_th_L due to the small up and down fluctuations. Thus, this region will be referred to as an "unstable region."

Assuming that the natural energy converting unit 11 is the photovoltaic power generation module, the unstable region can be generated immediately after the sunrise or immediately before the sunset or can be generated depending on the weather even in the daytime. Further, the unstable region is generated also in the case where other natural energy such as gas volume and wave power is converted into electrical power. In addition, also in a power generation module other than the natural energy converting unit 11, the unstable region in which the output suddenly fluctuates is present.

The battery storage system 10 according to this embodiment is configured to supply electrical power for ensuring the operation of the control circuit 127 from the battery storage cell 16 or the commercial power system 21 as the power supply source when the output voltage Vo of the natural energy converting unit 11 is in the unstable region. With this, even if the output voltage Vo of the natural energy converting unit 11 falls into the unstable region, it is possible to prevent the operation of the power converter 12 from being unstable.

[Operation of Battery Storage System 10 According to this Embodiment]

Figure 2:
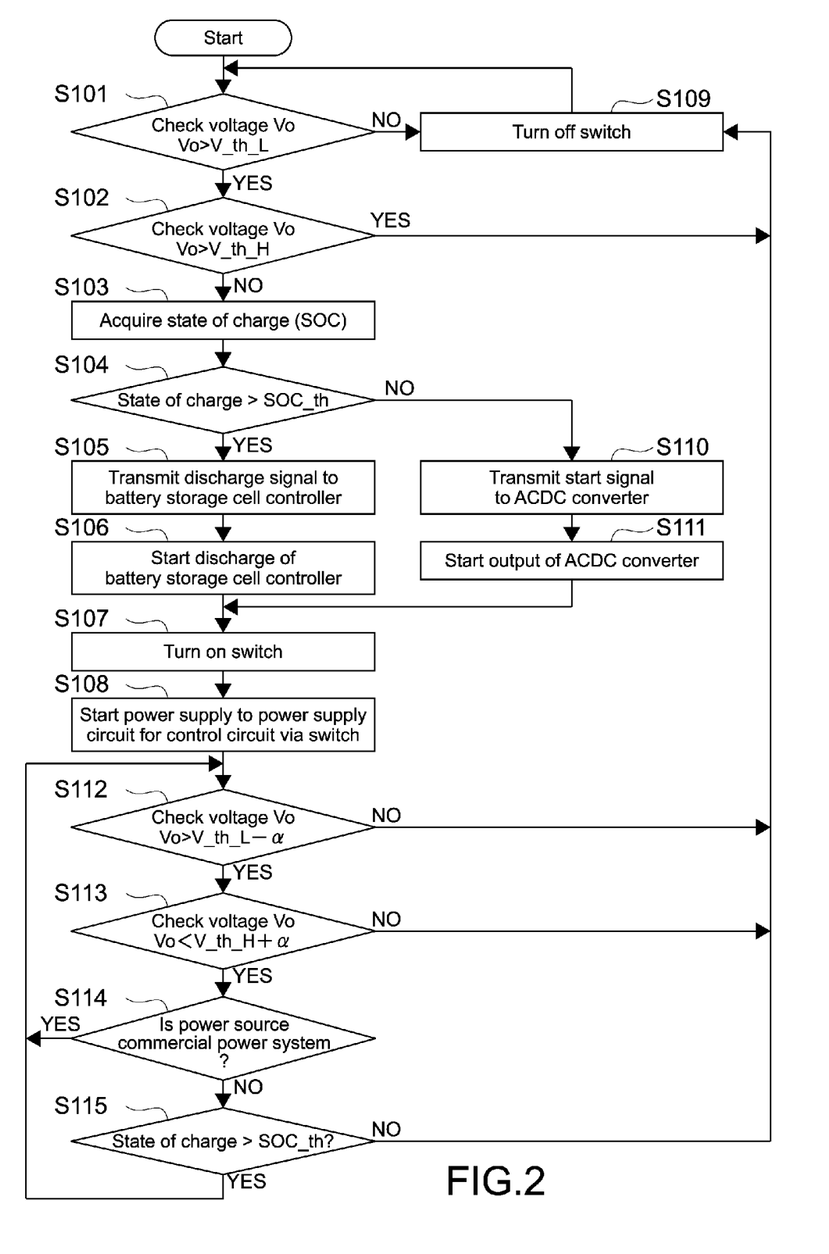
FIG. 2 is a flowchart showing a processing procedure of the battery storage system shown in FIG. 1.

FIG. 2 is a flowchart showing a processing procedure of the battery storage system 10 according to this embodiment.

The system controller 15 has a value of V_th_L (hereinafter, referred to as "first value") and a value of V_th_H (hereinafter, referred to as "second value") as values for evaluating the output voltage Vo of the natural energy converting unit 11.

Note that, for the sake of explaining the operation, it is assumed that the switch 18 is off. That is, it is assumed that the electrical power is not supplied from the commercial power system 21 and the battery storage cell 16 to the power supply circuit 126 for the control circuit in the power converter 12. This state is either one of the following two states. Specifically, in the one state, the output voltage Vo of the natural energy converting unit 11 is in the inoperable region, and hence the control circuit 127 is in an stand-by state (or suspension state). In the other state, the output voltage Vo of the natural energy converting unit 11 is in the stably operable region, and hence the control circuit 127 has already been activated by being supplied with electrical power necessary for the control circuit 127 from the output of the natural energy converting unit 11.

The system controller 15 determines whether or not the output voltage Vo of the natural energy converting unit 11, which is measured by the voltmeter 17, is larger than the first value (V_th_L) (Step S101). If determining that the output voltage Vo is not larger than the first value (V_th_L), that is, the output voltage Vo is in the inoperable region (NO of Step S101), the system controller 15 keeps the switch 18 off (Step S109) and returns to Step S101. With this, the operations of Steps S101 and S109 are repeated. As a result, the stand-by state (or suspension state) of the control circuit 127 of the power converter 12 is kept.

For example, if the natural energy converting unit 11 is the photovoltaic power generation module, for example, the output voltage Vo of the natural energy converting unit 11 is almost zero in the nighttime and is in the inoperable region. Therefore, the operations of Steps S101 and S109 are repeated and the control circuit 127 of the power converter 12 is kept in the stand-by state (or suspension state).

If determining that the output voltage Vo is larger than the first value (V_th_L) (YES of Step S101), the system controller 15 determines whether or not the output voltage Vo is larger than the second value (V_th_H) (Step S102). If determining that the output voltage Vo is larger than the second value (V_th_H) (YES of Step S102), also in this case, the system controller 15 keeps the switch 18 off (Step S109) and returns to Step S101. Note that, in this case, the control circuit 127 of the power converter 12 is operated with electrical power generated from the output of the natural energy converting unit 11, and hence the operations of Steps S101 and S109 are repeated with the result that the control circuit 127 of the power converter 12 is kept operated using the output of the natural energy converting unit 11.

For example, in the case where the natural energy converting unit 11 is the photovoltaic power generation module, the output voltage Vo of the natural energy converting unit 11 is in the stably operable region in the sunny weather in the daytime. Thus, the control circuit 127 of the power converter 12 is kept operated using the output of the natural energy converting unit 11.

If determining that the output voltage Vo is not larger than the second value (V_th_H) (NO of Step S102), the system controller 15 determines that the output voltage Vo is in the unstable region. For example, in the case where the natural energy converting unit 11 is the photovoltaic power generation module, the output of the natural energy converting unit 11 is in the unstable region during a period of time immediately after the sunrise or immediately before the sunset.

If determining that the output voltage Vo is in the unstable region, the system controller 15 acquires the state of charge (SOC) of the battery storage cell 16 from the battery storage cell controller 14 (Step S103).

The system controller 15 retains the value (SOC_th) of the SOC of the battery storage cell 16 for ensuring the operation of the control circuit 127 in advance. The system controller 15 determines whether or not the SOC of the battery storage cell 16 is equal to or larger than the value (SOC_th) (Step S104). If knowing that the SOC of the battery storage cell 16 is equal to or larger than the value (SOC_th) (YES of Step S104), the system controller 15 transmits a discharging signal to the battery storage cell controller 14 (Step S105). The battery storage cell controller 14 starts the discharge of the battery storage cell 16 in response to the discharge signal (Step S106).

After that, the system controller 15 turns on the switch 18 (Step S107). With this, electrical power for ensuring the operation of the control circuit 127 is supplied from the battery storage cell 16 to the power supply circuit 126 for the control circuit (Step S108).

Further, in Step S104, if the SOC of the battery storage cell 16 is smaller than the value (SOC_th) (NO of Step S104), the system controller 15 transmits a start signal to the ACDC converter 13 (Step S110). In response to this start signal, the ACDC converter 13 starts an operation of generating DC power from the AC power of the commercial power system 21 (Step S111).

After that, the system controller 15 turns on the switch 18 (Step S107). With this, the electrical power for ensuring the operation of the control circuit 127 is supplied from the ACDC converter 13 to the power supply circuit 126 for the control circuit (Step S108).

The system controller 15 checks again the magnitude of the output voltage Vo, which is obtained by the voltmeter 17, after the switch 18 is turned on and the following evaluation is carried out.

In order to evaluate the output voltage Vo after the switch 18 is turned on, the system controller 15 prepares the third value and the fourth value in advance.

Figure 4:
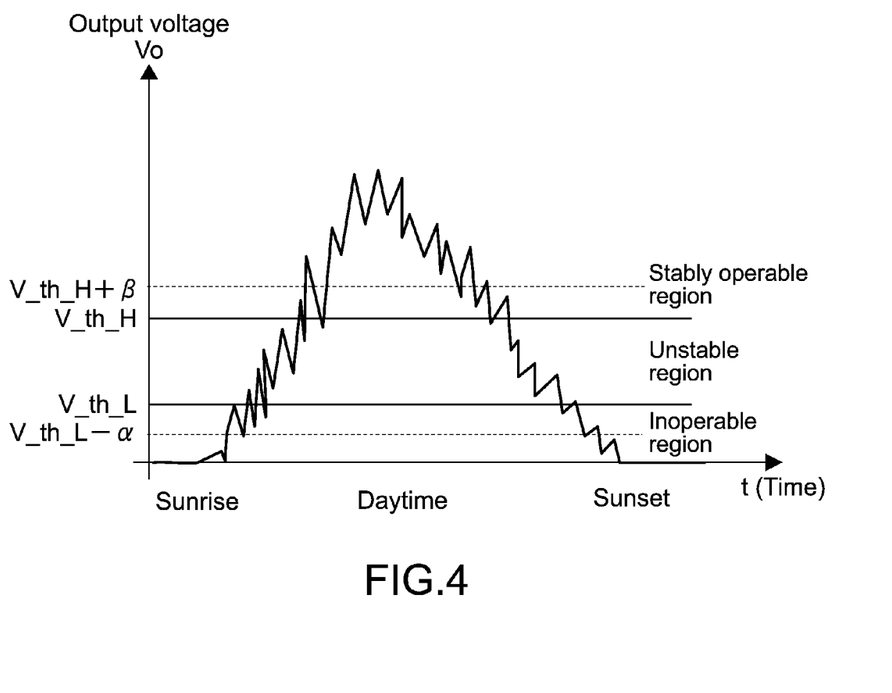

FIG. 4 is a view for describing the third value and the fourth value.

The third value is a value V_th_L−α smaller than the first value (V_th_L) by an amount corresponding to a predetermined margin α. The fourth value is a value V_th_H+β larger than the second value (V_th_H) by an amount corresponding to a predetermined margin β. Note that α and β may be the same value or may be different values.

If the output voltage Vo is equal to or smaller than the third value (V_th_L−α) (NO of Step S112), the system controller 15 turns off the switch 18 in Step S109 and monitors the output voltage Vo of the natural energy converting unit 11, returning to Step S101 again. That is, the system controller 15 knows at this time that it is nighttime, for example, when the control circuit 127 of the power converter 12 may be in the stand-by state (or suspension state), and turns off the switch 18 to stop the supply of electrical power from the commercial power system 21 or the battery storage cell 16 to the power supply circuit 126 for the control circuit of the power converter 12.

If the output voltage Vo is larger than the third value (V_th_L−α) (YES of Step S112), the system controller 15 determines whether or not the output voltage Vo is equal to or larger than the fourth value (V_th_H+β) (Step S113). If the output voltage Vo is equal to or larger than the fourth value (V_th_H+β) (NO of Step S113), the control circuit 127 of the power converter 12 knows at this time that the stable operation can be performed using the output from the natural energy converting unit 11. Thus, the control circuit 127 turns off the switch 18 in Step S109 to stop the supply of electrical power from the commercial power system 21 or the battery storage cell 16 to the power supply circuit 126 for the control circuit of the power converter 12, and monitors the output voltage Vo of the natural energy converting unit 11, returning to Step S101 again.

If the output voltage Vo is smaller than the fourth value (V_th_H+β) (YES of Step S113), the system controller 15 checks whether the power supply source to the power supply circuit 126 for the control circuit of the power converter 12 is the commercial power system 21 or the battery storage cell 16 (Step S114). The determination of the power supply source is managed by the system controller 15. If the power supply source is the commercial power system 21 (YES of Step S114), the system controller 15 continues monitoring the output voltage Vo, returning to Step S112. If the power supply source is the battery storage cell 16 (NO of Step S114), the system controller 15 checks the SOC of the battery storage cell 16 (Step S115).

If the SOC of the battery storage cell 16 is larger the predetermined value (SOC_th) (YES of Step S115), the system controller 15 continues monitoring the output voltage Vo, returning to Step S114. If the SOC of the battery storage cell 16 is equal to or smaller than the value (SOC_th) (NO of Step S115), the system controller 15 turns off the switch 18 (Step S109) and monitors the output voltage Vo of the natural energy converting unit 11, returning to Step S101.

Effects and the Like of this Embodiment

1. The magnitude of the output of the natural energy converting unit 11 depends on the state of the nature. When the output voltage Vo of the natural energy converting unit 11 is in the unstable region, the operation of the control circuit 127 of the power converter 12 that is operated obtaining electrical power from the output of the natural energy converting unit 11 becomes also unstable. Therefore, the system controller 15 determines whether or not the output voltage Vo of the natural energy converting unit 11 is in the unstable region. If the output voltage Vo of the natural energy converting unit 11 is in the unstable region, the system controller 15 performs control to supply electrical power of another power supply source, for example, the commercial power system 21 or the battery storage cell 16 to the power supply circuit 126 for the control circuit of the power converter 12. With this, it is possible to prevent the operation of the control circuit 127 of the power converter 12 from being unstable in the unstable region.

2. In this battery storage system 10, when the electrical power of the commercial power system 21 or the battery storage cell 16 is supplied to the control circuit 127, unless the output voltage Vo is equal to or smaller than the third value (V_th_L−α) smaller than the first value or the output voltage Vo is equal to or larger than the fourth value (V_th_H+β) larger than the second value, the supply of electrical power is not stopped. With this, it is possible to prevent the switch 18 from frequently repeating undesirable on/off operations in such a manner that immediately after the switch 18 is turned on, the switch 18 is turned off due to the small fluctuations of the output voltage Vo. As a result, it is possible to stabilize the control of the battery storage cell controller 14 and the operation of the ACDC converter 13.

[Method of Determining Margins α and β]

The values of the margins α and β are determined in view of the fluctuation amount (small fluctuations) of the output voltage Vo immediately after the sunrise or immediately before the sunset, for example. The system controller 15 may retain data of the output voltage Vo of a certain period in an internal memory and determine the margins α and β by analyzing the data.

Figure 5:
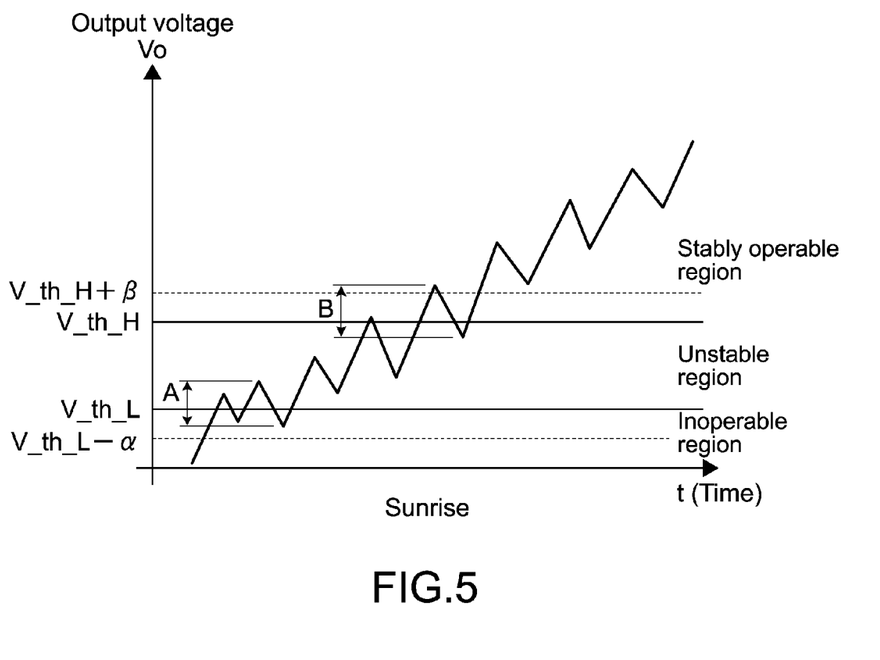
FIG. 5 is a view showing fluctuations of the output voltage Vo immediately after the sunset for describing a method of determining margins α and β.

FIG. 5 is a view showing fluctuations of the output voltage Vo immediately after the sunset. As can be seen from the figure, the output voltage Vo gradually increases while repeating small upper and lower fluctuations from zero or almost zero immediately after the sunset. The system controller 15 accumulates the data of such output voltage Vo of a certain period immediately after the sunset in the internal memory. A maximum fluctuation amount A when the value of the output voltage Vo exceeds the first value (V_th_L), decreases, and drops below the first value is set as the margin α.

Alternatively, the maximum fluctuation amount A of several days may be the margin α. Similarly, a maximum fluctuation amount B when the value of the output voltage Vo exceeds the second value (V_th_H), decreases, and drops below the second value is set as the margin β. Alternatively, the maximum fluctuation amount B of the several days may be set as the margin β. In addition, larger one of the fluctuation amount A and the fluctuation amount B may be set as the margin α and the margin β.

In addition, the system controller 15 may retain the values of the fluctuation amount A and the fluctuation amount B in the internal memory in advance throughout a year and determine the margin α and the margin β based on the fluctuation amount A and the fluctuation amount B corresponding to the current season.

Modified Example 1

Although, in the above-mentioned embodiment, the system using the battery storage cell 16 and the commercial power system 21 as the power supply sources other than the natural energy converting unit 11 is employed, a system configuration including at least one of the battery storage cell 16 and the commercial power system 21 may be employed.

Modified Example 2

In the above-mentioned embodiment, the case where the module for converting the energy of nature (natural energy) such as sunlight, wave power, wind power, and terrestrial heat into electrical power is used as the energy converting unit is assumed. However, the present application is not limited thereto and is effective also in the case where various energy converting units whose output is likely to or can suddenly fluctuate over time. A fuel cell is exemplified.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A battery storage system, comprising:
an energy converting unit configured to generate electrical power from natural energy;
a power converter including
a control circuit, and
a circuit that is controlled by the control circuit to generate electrical power to be supplied from an output of the energy converting unit to a load and electrical power to be supplied to the control circuit;
a power supply source including a battery storage cell and a commercial power system; and
a host control circuit configured to perform control such that electrical power is supplied (i) from the power supply source to the control circuit when an output of the energy converting unit is between a first value and a second value larger than the first value, and (ii) from the energy converting unit to the control circuit when the output of the energy converting unit is larger than the second value.

2. The battery storage system according to claim 1, wherein
the first value is a value at which an operation of the control circuit is started, and the second value is a value for ensuring the operation of the control circuit.

3. The battery storage system according to claim 2, wherein
the host control circuit is configured to perform control such that, when the output of the energy converting unit is lower than a third value set in advance as a value lower than the first value during supply of electrical power from the power supply source to the control circuit, the supply of electrical power from the power supply source to the control circuit is stopped.

4. The battery storage system according to claim 2, wherein
the host control circuit is configured to perform control such that, when the output of the energy converting unit is higher than a fourth value set in advance as a value higher than the second value during supply of electrical power from the power supply source to the control circuit, the supply of electrical power from the power supply source to the control circuit is stopped.

5. The battery storage system according to claim 1, wherein
the host control circuit is configured to accumulate data of the output of the energy converting unit and update, based on the data, the third value and the fourth value.

6. The battery storage system according to claim 1, wherein
the host control circuit is configured to acquire, when controlling such that electrical power is supplied from the power supply source to the control circuit, information of a state of charge (SOC) of the battery storage cell, and control such that electrical power is supplied from the battery storage cell to the control circuit when the SOC is larger than a predetermined value and that electrical power is supplied from the commercial power system to the control circuit when the SOC is equal to or smaller than the predetermined value.

7. A controlling method of a battery storage system, comprising
performing control such that electrical power is supplied
(i) from a power supply source including a battery storage cell and a commercial power system to a control circuit of a power converter when an output of an energy converting unit configured to generate electrical power from natural energy is between a first value and a second value larger than the first value, and (ii) from the energy converting unit configured to generate electrical power from natural energy to the control circuit when the output of the energy converting unit is larger than the second value, the power converter including the control circuit and a circuit that is controlled by the control circuit to generate electrical power to be supplied from the output of the energy converting unit to a load and electrical power to be supplied to the control circuit.

* * * * *